US012304032B2

(12) United States Patent
Zhao

(10) Patent No.: US 12,304,032 B2
(45) Date of Patent: May 20, 2025

(54) IMPACT TOOL

(71) Applicant: MAKITA CORPORATION, Anjo (JP)

(72) Inventor: Ding Zhao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 79 days.

(21) Appl. No.: 18/217,859

(22) Filed: Jul. 3, 2023

(65) Prior Publication Data

US 2024/0051094 A1 Feb. 15, 2024

(30) Foreign Application Priority Data

Aug. 10, 2022 (JP) ................................ 2022-128129

(51) Int. Cl.

*B25B 21/02* (2006.01)
*B25D 16/00* (2006.01)
*B25D 17/26* (2006.01)
*B25F 5/02* (2006.01)

(52) U.S. Cl.

CPC .............. *B25B 21/02* (2013.01); *B25D 16/00* (2013.01); *B25D 17/26* (2013.01); *B25F 5/02* (2013.01)

(58) Field of Classification Search

CPC .......... B25B 21/02; B25F 5/02; B25D 16/00; B25D 17/26; B25D 2217/0096; B25D 2250/111

See application file for complete search history.

(56) References Cited

U.S. PATENT DOCUMENTS 1,211,417 A * 1/1917 Davis ..................... B25D 17/08 279/19
1,592,851 A * 7/1926 Hansen .................. B25D 17/08 279/19.5
1,605,435 A * 11/1926 Hansen .................. B25D 17/08 173/133
RE17,300 E * 5/1929 Skaer ................... B25D 17/082 279/19.1
1,785,177 A * 12/1930 Bollock ................. B25D 17/08 279/19

(Continued)

FOREIGN PATENT DOCUMENTS

JP 2009285756 A * 12/2009 ............ B25B 13/58
JP 2021-037560 A 3/2021

*Primary Examiner* — Gloria R Weeks
*Assistant Examiner* — Mobeen Ahmed
(74) *Attorney, Agent, or Firm* — Oliff PLC

(57) ABSTRACT

The impact tool is less likely to have a shorter service life. An impact tool includes a motor, a spindle at least partially located frontward from the motor and rotatable by the motor, a hammer surrounding the spindle, and an anvil at least partially located frontward from the spindle and strikable by the hammer in a rotation direction. The spindle includes an internal space extending frontward from an opening in a rear end face of the spindle. The internal space includes a first space having a first inner diameter and connected to the opening, a second space located frontward from the first space and having a second inner diameter smaller than the first inner diameter, and a third space connected to a front end of the second space and having a third inner diameter larger than the second inner diameter. The third space contains a lubricant oil.

19 Claims, 9 Drawing Sheets

(56) References Cited

U.S. PATENT DOCUMENTS

| | | | | | |
|---|---|---|---|---|---|
| 2,214,033 | A * | 9/1940 | Sullivan | B25D 17/08 | 279/19 |
| 3,001,428 | A * | 9/1961 | Sindelar | B25B 21/026 | 173/93.6 |
| 3,174,365 | A * | 3/1965 | Lucarelli | B25B 33/005 | 248/230.8 |
| 5,207,528 | A * | 5/1993 | Ludwig | B25B 21/00 | 403/322.2 |
| 10,383,429 | B2 * | 8/2019 | Moreau | A45F 5/021 | |
| 10,716,390 | B2 * | 7/2020 | Wagner | A45F 5/00 | |
| 10,967,496 | B2 * | 4/2021 | Kumagai | B25D 17/26 | |
| 11,839,965 | B2 * | 12/2023 | Kawai | B25F 5/02 | |
| 11,911,889 | B1 * | 2/2024 | Pascua | A45F 5/021 | |
| 2003/0019644 | A1 * | 1/2003 | Richter | B25D 16/00 | 173/114 |
| 2004/0231101 | A1 * | 11/2004 | Alanis | B25H 3/00 | 16/110.1 |
| 2006/0180327 | A1 * | 8/2006 | Nagasaka | B25B 21/02 | 173/128 |
| 2008/0006421 | A1 * | 1/2008 | Herting | B25D 17/06 | 173/132 |
| 2009/0127302 | A1 * | 5/2009 | Pruitt | B25B 23/00 | 224/219 |
| 2009/0223691 | A1 * | 9/2009 | Ikuta | B25D 17/26 | 173/171 |
| 2012/0267403 | A1 * | 10/2012 | Ward, Jr. | A45F 5/00 | 224/219 |
| 2012/0292865 | A1 * | 11/2012 | Sugimoto | B25F 5/00 | 279/142 |
| 2015/0041169 | A1 * | 2/2015 | Kumagai | B25D 17/26 | 173/93.7 |
| 2015/0101950 | A1 * | 4/2015 | Wirth | B25B 13/468 | 206/378 |
| 2016/0208835 | A1 * | 7/2016 | Derr | A45F 5/00 | |
| 2016/0354889 | A1 * | 12/2016 | Ely | B23Q 17/2404 | |
| 2017/0036327 | A1 * | 2/2017 | Murakami | B25F 5/006 | |
| 2017/0252833 | A1 * | 9/2017 | Bayona Salazar | B25F 5/026 | |
| 2017/0259412 | A1 * | 9/2017 | Nishikawa | B25B 21/026 | |
| 2017/0282352 | A1 * | 10/2017 | Brull | B23Q 3/15706 | |
| 2019/0134800 | A1 * | 5/2019 | Kumagai | B25D 17/26 | |
| 2019/0262978 | A1 * | 8/2019 | Tejima | B25B 21/026 | |
| 2020/0009709 | A1 * | 1/2020 | Kumagai | B25B 21/02 | |
| 2020/0194747 | A1 * | 6/2020 | Rudolph | B25H 3/00 | |
| 2020/0269407 | A1 * | 8/2020 | Kawai | B25D 16/00 | |
| 2020/0386003 | A1 * | 12/2020 | Moreau | E04G 5/003 | |
| 2020/0390224 | A1 * | 12/2020 | Salisbury | B65D 63/1072 | |
| 2021/0060755 | A1 * | 3/2021 | Kawai | B25F 5/00 | |
| 2021/0138626 | A1 * | 5/2021 | Brull | B25B 21/00 | |
| 2022/0219305 | A1 * | 7/2022 | Heep | B25D 17/26 | |
| 2023/0390914 | A1 * | 12/2023 | Chang | B25F 5/02 | |

* cited by examiner

IMPACT TOOL

CROSS-REFERENCE TO RELATED APPLICATIONS

This application claims the benefit of priority to Japanese Patent Application No. 2022-128129, filed on Aug. 10, 2022, the entire contents of which are hereby incorporated by reference.

BACKGROUND

1. Technical Field

The present disclosure relates to an impact tool.

2. Description of the Background

In the field of impact tools, an impact tool is known as described in Japanese Unexamined Patent Application Publication No. 2021-037560 (hereafter, Patent Literature 1). The impact tool described in Patent Literature 1 includes a spindle and a hammer surrounding the spindle. The spindle contains a lubricant oil in its internal space. The lubricant oil is supplied to between the spindle and the hammer from the internal space of the spindle.

BRIEF SUMMARY

Any leak of the lubricant oil from the internal space of the spindle can reduce the amount of lubricant oil supplied to between the spindle and the hammer. This may cause severe wear or seizure of either the spindle or the hammer or both, and may shorten the service life of the impact tool.

One or more aspects of the present disclosure are directed to an impact tool that is less likely to have a shorter service life.

A first aspect of the present disclosure provides an impact tool, including:

- a motor;
- a spindle at least partially located frontward from the motor and rotatable by the motor, the spindle including an internal space extending frontward from an opening in a rear end face of the spindle, the internal space including
  - a first space having a first inner diameter and connected to the opening,
  - a second space located frontward from the first space and having a second inner diameter smaller than the first inner diameter, and
  - a third space connected to a front end of the second space and having a third inner diameter larger than the second inner diameter, the third space containing a lubricant oil;
- a hammer surrounding the spindle; and
- an anvil at least partially located frontward from the spindle, the anvil being strikable by the hammer in a rotation direction.

A second aspect of the present disclosure provides an impact tool, including:

- a motor;
- a spindle at least partially located frontward from the motor and rotatable by the motor, the spindle including
  - a spindle shaft,
  - a spindle protrusion protruding frontward from a front end of the spindle shaft, and
  - a receiving recess recessed rearward from a front end face of the spindle protrusion facing frontward;
- a hammer surrounding the spindle shaft; and
- an anvil at least partially located frontward from the spindle, the anvil being strikable by the hammer in a rotation direction, the anvil including
  - an anvil recess receiving the spindle protrusion on a rear end face of the anvil, and
  - a projection protruding rearward from a bottom surface of the anvil recess facing rearward, the projection being located inside the receiving recess.

A third aspect of the present disclosure provides an impact tool, including:

- a motor;
- a spindle at least partially located frontward from the motor and rotatable by the motor;
- a hammer surrounding the spindle;
- an anvil at least partially located frontward from the spindle, the anvil being strikable by the hammer in a rotation direction; and
- a hammer case supporting the anvil with an anvil bearing,
- wherein the anvil has a tool hole to receive a rear portion of a socket,
- a socket holder to hold the socket with a connector is attachable to the hammer case,
- the socket holder includes
  - an arc to be hooked on a hook on the hammer case,
  - a first holder at one end of the arc,
  - a second holder at another end of the arc, and
  - an elastic ring to fasten the first holder and the second holder together, and
- the connector is connectable to each of the first holder and the second holder.

The impact tool according to the above aspects of the present disclosure is less likely to have a shorter service life.

DETAILED DESCRIPTION

Embodiments

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an impact tool 1. The impact tool 1 includes a motor 6 as a power source.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in the front-rear direction. A first axial direction is from the rear to the front, and a second axial direction is from the front to the rear. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

Impact Tool

Figure 1:
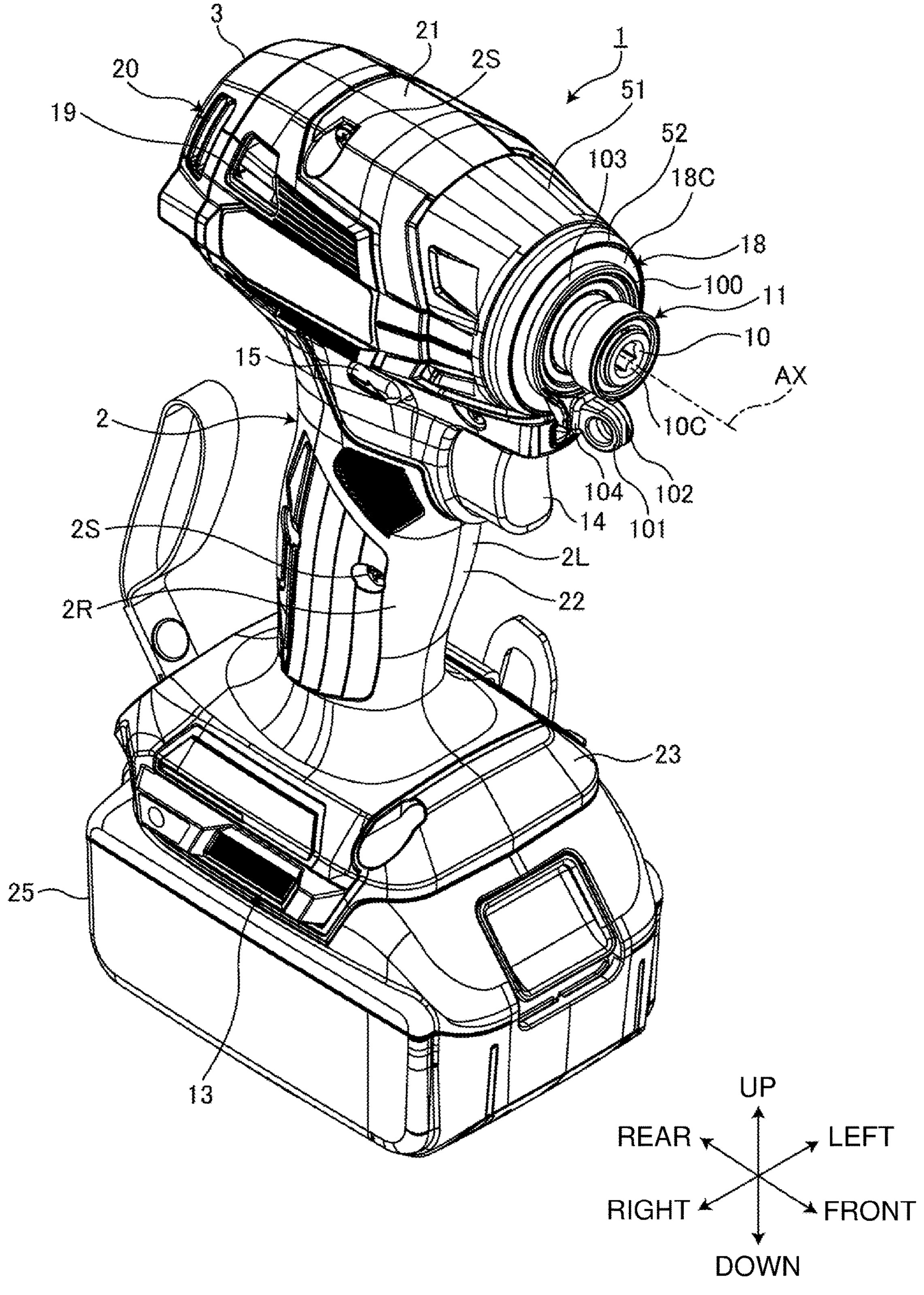
FIG. 1 is a perspective view of an impact tool according to an embodiment as viewed from the front.
Figure 2:
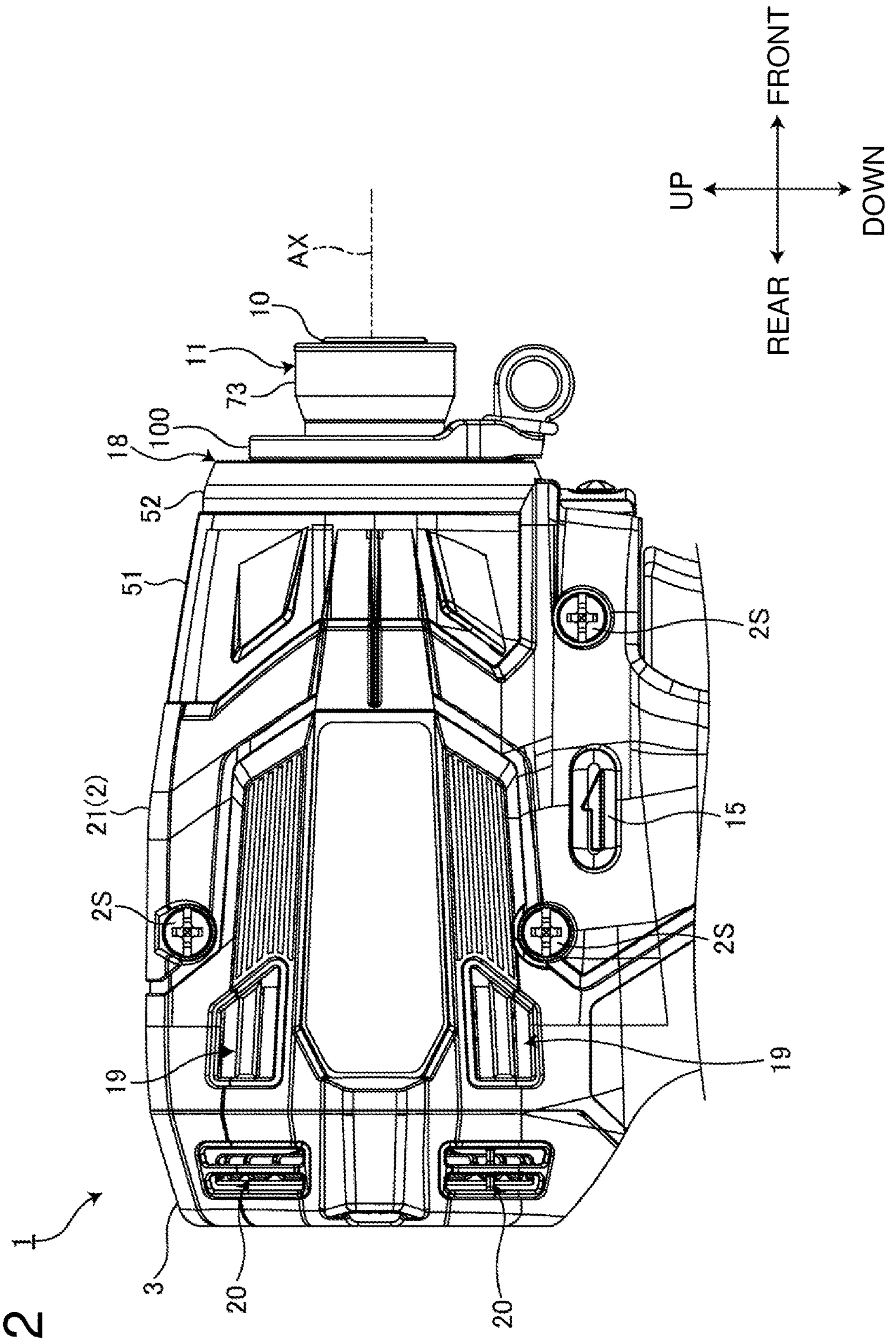
FIG. 2 is a side view of an upper portion of the impact tool according to the embodiment.
Figure 3:
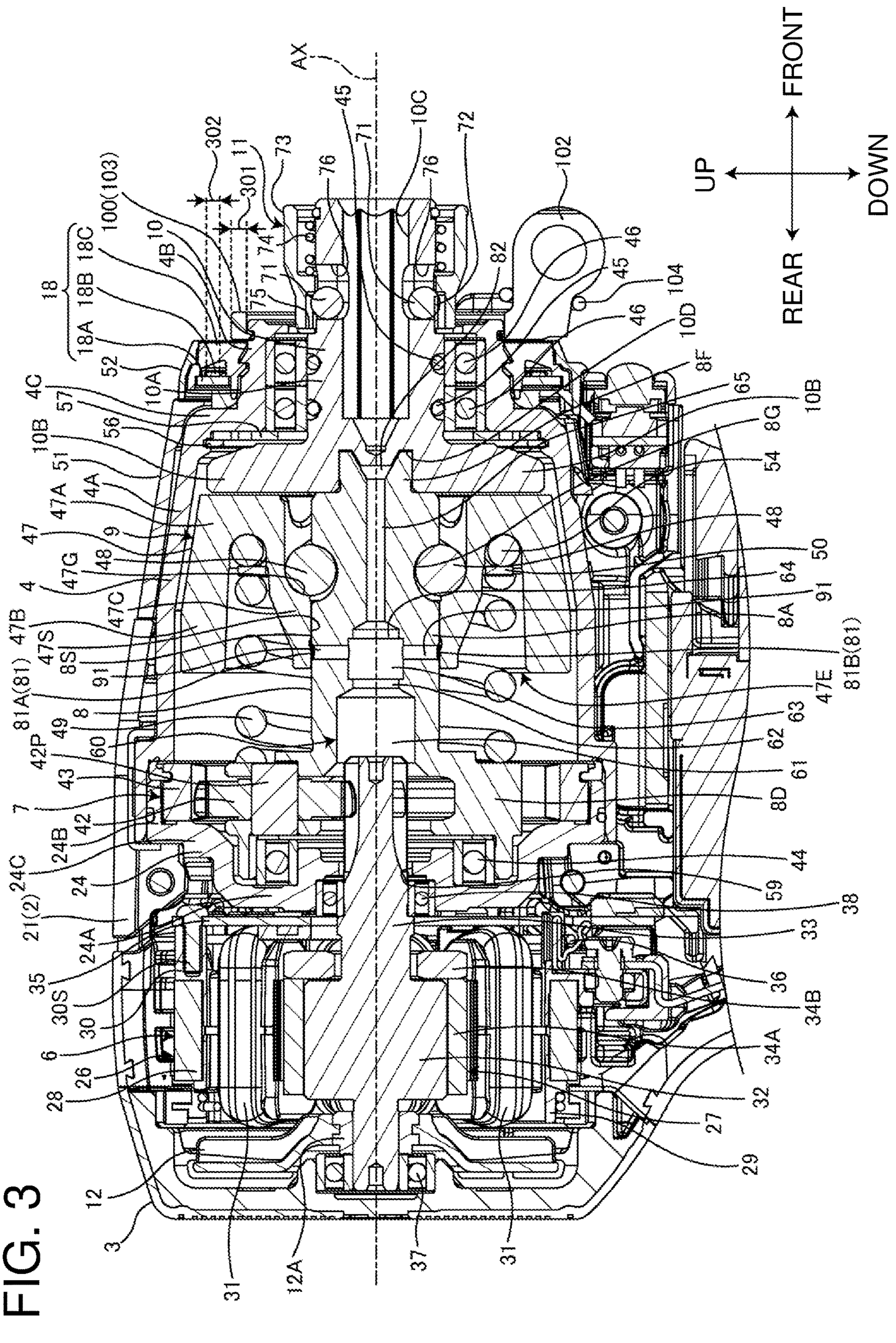
FIG. 3 is a longitudinal sectional view of the upper portion of the impact tool according to the embodiment.
Figure 4:
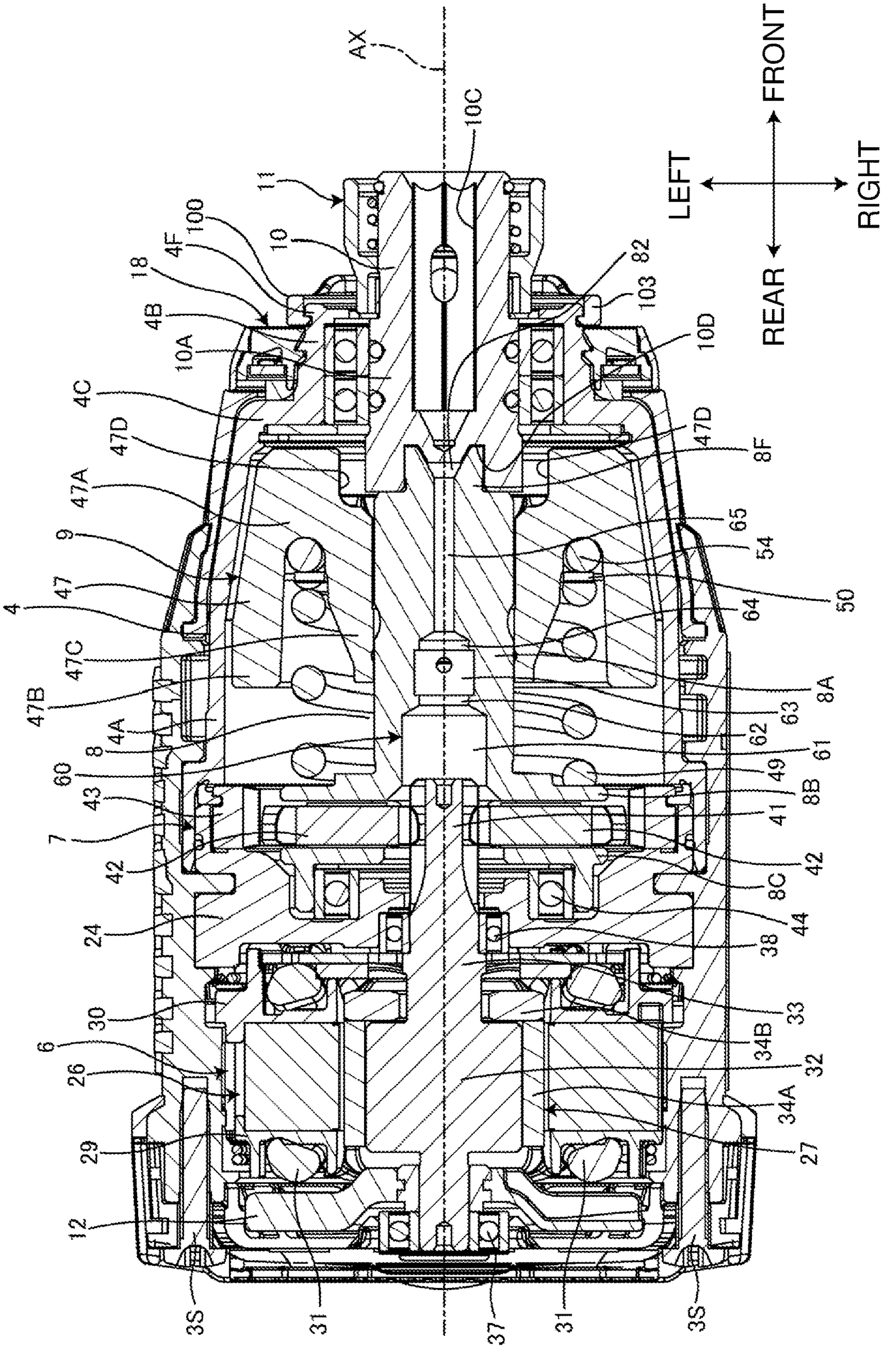
FIG. 4 is a horizontal sectional view of the upper portion of the impact tool according to the embodiment.

FIG. 1 is a perspective view of the impact tool 1 according to an embodiment as viewed from the front. FIG. 2 is aside view of an upper portion of the impact tool 1. FIG. 3 is a longitudinal sectional view of the upper portion of the impact tool 1. FIG. 4 is a horizontal sectional view of the upper portion of the impact tool 1.

The impact tool 1 according to the embodiment is an impact driver as a screwing tool. The impact tool 1 includes a housing 2, a rear cover 3, a hammer case 4, a bearing box 24, a hammer case cover 51, a motor 6, a reducer 7, a spindle 8, a striker 9, an anvil 10, a tool holder 11, a fan 12, a battery mount 13, a trigger lever 14, a forward-reverse switch lever 15, a light assembly 18, and a light cover 52.

The housing 2 is formed from a synthetic resin. The housing 2 in the embodiment is formed from nylon. The housing 2 includes a left housing 2L and a right housing 2R. The right housing 2R is located on the right of the left housing 2L. The left and right housings 2L and 2R are fastened together with multiple screws 2S. The housing 2 includes a pair of housing halves.

The housing 2 includes a motor compartment 21, a grip 22, and a battery holder 23.

The motor compartment 21 accommodates the motor 6. The motor compartment 21 accommodates at least apart of the hammer case 4. The motor compartment 21 is cylindrical.

The grip 22 is grippable by an operator. The grip 22 extends downward from the motor compartment 21. The trigger lever 14 is located in an upper portion of the grip 22.

The battery holder 23 holds a battery pack 25 with the battery mount 13. The battery holder 23 is connected to the lower end of the grip 22. The battery holder 23 has larger outer dimensions than the grip 22 in the front-rear direction and the lateral direction.

The rear cover 3 covers an opening in the rear end of the motor compartment 21. The rear cover 3 is located at the rear of the motor compartment 21. The rear cover 3 accommodates at least apart of the fan 12. The fan 12 is located inward from the rear cover 3. The rear cover 3 holds a rear rotor bearing 37. The rear cover 3 is formed from a synthetic resin. The rear cover 3 is fastened to the rear end of the motor compartment 21 with two screws 3S.

The motor compartment 21 has inlets 19. The rear cover 3 has outlets 20. Air outside the housing 2 flows into an internal space of the housing 2 through the inlets 19, and then flows out of the housing 2 through the outlets 20.

The hammer case 4 accommodates at least a part of the reducer 7, the spindle 8, the striker 9, and at least a part of the anvil 10. The hammer case 4 is formed from a metal. The hammer case 4 in the embodiment is formed from aluminum. The hammer case 4 is cylindrical. The hammer case 4 includes a larger cylinder 4A, a smaller cylinder 4B, and a joint 4C. The smaller cylinder 4B is located frontward from the larger cylinder 4A. The front end of the larger cylinder 4A and the rear end of the smaller cylinder 4B are connected to each other with the joint 4C. The joint 4C is annular. The larger cylinder 4A has a larger outer diameter than the smaller cylinder 4B. The larger cylinder 4A has a larger inner diameter than the smaller cylinder 4B.

The bearing box 24 accommodates at least a part of the reducer 7. The bearing box 24 holds a front rotor bearing 38 and a spindle bearing 44. The bearing box 24 is formed from a metal. The bearing box 24 is fastened to a rear portion of the hammer case 4.

The bearing box 24 includes a rear annular portion 24A and a front annular portion 24B. The front annular portion 24B is located frontward from the rear annular portion 24A. The front end of the rear annular portion 24A and the rear end of the front annular portion 24B are connected to each other with a joint 24C. The joint 24C is annular. The rear annular portion 24A has a smaller outer diameter than the front annular portion 24B. The rear annular portion 24A has a smaller inner diameter than the front annular portion 24B.

The bearing box 24 and the hammer case 4 may be fastened together by screwing or by fitting (engagement). For example, the front annular portion 24B may have threads on its outer circumference, and the larger cylinder 4A may have threaded grooves on its inner circumference. The threads on the front annular portion 24B may be engaged with the threaded grooves on the larger cylinder 4A to fasten the bearing box 24 and the hammer case 4 together. The front annular portion 24B may be fitted in the larger cylinder 4A to fasten the bearing box 24 and the hammer case 4 together. The front rotor bearing 38 is located radially inward from the rear annular portion 24A. The spindle bearing 44 is located radially inward from the joint 24C.

The hammer case 4 is held between the left housing 2L and the right housing 2R. The hammer case 4 includes the rear portion accommodated in the motor compartment 21. The hammer case 4 is connected to the front of the motor compartment 21. The bearing box 24 is fixed to the motor compartment 21 and the hammer case 4.

The hammer case cover 51 protects the hammer case 4. The hammer case cover 51 reduces contact between the hammer case 4 and objects nearby. The hammer case cover 51 covers the outer circumferential surface of the larger cylinder 4A. The hammer case cover 51 may be eliminated.

The motor 6 is a power source for the impact tool 1. The motor 6 is an inner-rotor brushless motor. The motor 6 includes a stator 26 and a rotor 27. The stator 26 is supported on the motor compartment 21. The rotor 27 is at least partially located inward from the stator 26. The rotor 27 rotates relative to the stator 26. The rotor 27 rotates about the rotation axis AX extending in the front-rear direction.

The stator 26 includes a stator core 28, a rear insulator 29, a front insulator 30, and multiple coils 31.

The stator core 28 includes multiple steel plates stacked on one another. The steel plates are metal plates formed from iron as a main component. The stator core 28 is cylindrical.

The stator core 28 is located radially outward from the rotor 27. The stator core 28 includes multiple teeth to support the coils 31.

The rear insulator 29 and the front insulator 30 are electrical insulating members formed from a synthetic resin. The rear insulator 29 and the front insulator 30 each electrically insulate the stator core 28 and the coils 31. The rear insulator 29 is fixed to the rear of the stator core 28. The front insulator 30 is fixed to the front of the stator core 28. The rear insulator 29 partially covers the surfaces of the teeth. The front insulator 30 partially covers the surfaces of the teeth.

The coils 31 are attached to the stator core 28 with the rear insulator 29 and the front insulator 30 in between. The coils 31 surround the teeth on the stator core 28 with the rear insulator 29 and the front insulator 30 in between. The coils 31 and the stator core 28 are electrically insulated from each other with the front insulator 30 and the rear insulator 29 in between. The coils 31 are connected to one another with fusing terminals 36.

The rotor 27 rotates about the rotation axis AX. The rotor 27 includes a rotor core 32, a rotor shaft 33, a rotor magnet 34A, and a sensor magnet 34B.

The rotor core 32 and the rotor shaft 33 are formed from steel. In the embodiment, the rotor core 32 is integral with the rotor shaft 33. The rotor shaft 33 includes a rear portion protruding rearward from the rear end face of the rotor core 32. The rotor shaft 33 includes a front portion protruding frontward from the front end face of the rotor core 32.

The rotor magnet 34A is fixed to the rotor core 32. The rotor magnet 34A in the embodiment surrounds the rotor core 32. The sensor magnet 34B is fixed to the rotor core 32. The sensor magnet 34B in the embodiment is located on the front end face of the rotor core 32.

A sensor board 35 is attached to the front insulator 30. The sensor board 35 is fastened to the front insulator 30 with a screw 30S. The sensor board 35 includes an annular circuit board and a rotation detector supported on the circuit board. The sensor board 35 at least partially faces the front end face of the sensor magnet 34B. The rotation detector detects the position of the sensor magnet 34B to detect the position of the rotor 27 in the rotation direction.

The rotor shaft 33 has the rear end rotatably supported by the rear rotor bearing 37. The rotor shaft 33 has the front end rotatably supported by the front rotor bearing 38. The rear rotor bearing 37 is held by the rear cover 3. The front rotor bearing 38 is held by the bearing box 24.

The front end of the rotor shaft 33 is located in the internal space of the hammer case 4 through an opening 59 in the rear annular portion 24A of the bearing box 24.

A pinion gear 41 is fixed to the front end of the rotor shaft 33. The pinion gear 41 is connected to at least a part of the reducer 7. The rotor shaft 33 is connected to the reducer 7 with the pinion gear 41.

The reducer 7 connects the rotor shaft 33 and the spindle 8 together. The rotor 27 drives the gears in the reducer 7. The reducer 7 transmits rotation of the rotor 27 to the spindle 8. The reducer 7 rotates the spindle 8 at a lower rotational speed than the rotor shaft 33. The reducer 7 is located frontward from the stator 26. The reducer 7 includes a planetary gear assembly.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42.

The internal gear 43 is fixed to the larger cylinder 4A in the hammer case 4. The internal gear 43 is constantly nonrotatable relative to the hammer case 4.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, rotates at a lower rotational speed than the rotor shaft 33.

The spindle 8 is rotated about the rotation axis AX by the motor 6. The spindle 8 is rotated by the rotor 27. The spindle 8 rotates with a rotational force from the rotor 27 transmitted through the reducer 7. The spindle 8 transmits a rotational force from the motor 6 to the anvil 10 with balls 48 and a hammer 47 in between. The spindle 8 is at least partially located frontward from the motor 6. The spindle 8 is located frontward from the stator 26. The spindle 8 is at least partially located frontward from the rotor 27. The spindle 8 is at least partially located frontward from the reducer 7. The spindle 8 is at least partially located rearward from the anvil 10.

The spindle 8 includes a spindle shaft 8A, a first flange 8B, a second flange 8C, a connecting portion 8D, and a spindle protrusion 8F.

The spindle shaft 8A is a rod elongated in the front-rear direction. The spindle shaft 8A has the central axis aligned with the rotation axis AX. The first flange 8B extends radially outward from the rear end of the outer circumferential surface of the spindle shaft 8A. The second flange 8C is located rearward from the first flange 8B. The second flange 8C is annular. The connecting portion 8D connects a portion of the first flange 8B to a portion of the second flange 8C. The spindle protrusion 8F protrudes frontward from the front end of the spindle shaft 8A.

The first flange 8B supports the front end of the pin 42P. The second flange 8C supports the rear end of the pin 42P. The planetary gears 42 are located between the first flange 8B and the second flange 8C. The planetary gears 42 are rotatably supported by the first flange 8B and the second flange 8C with the pin 42P. The spindle bearing 44 is located inside a cylindrical portion of the spindle 8 protruding rearward from the rear surface of the second flange 8C. The spindle bearing 44 holds the cylindrical portion of the spindle 8. The spindle bearing 44 is held on the bearing box 24.

The striker 9 is driven by the motor 6. A rotational force from the motor 6 is transmitted to the striker 9 through the reducer 7 and the spindle 8. The striker 9 strikes the anvil 10 in the rotation direction in response to a rotational force of the spindle 8 rotated by the motor 6. The striker 9 includes the hammer 47, two balls 48, a coil spring 49, and a washer 50. The striker 9 including the hammer 47, the balls 48, the coil spring 49, and the washer 50 is accommodated in the larger cylinder 4A in the hammer case 4.

The hammer 47 is located frontward from the reducer 7. The hammer 47 surrounds the spindle 8. The hammer 47 surrounds the spindle shaft 8A. The hammer 47 is held by the spindle shaft 8A. The balls 48 are located between the spindle 8 and the hammer 47.

The hammer 47 includes a body 47A, an outer cylinder 47B, an inner cylinder 47C, and two hammer projections 47D. The body 47A surrounds the spindle shaft 8A. The body 47A is annular. The outer cylinder 47B and the inner cylinder 47C both protrude rearward from the body 47A. The outer cylinder 47B is located radially outside the inner cylinder 47C. A recess 47E is defined by the rear surface of the body 47A, the inner circumferential surface of the outer cylinder 47B, and the outer circumferential surface of the inner cylinder 47C. The recess 47E is recessed frontward from the rear end of the hammer 47. The recess 47E is annular. The spindle shaft 8A is located radially inward from the body 47A and the inner cylinder 47C. The inner cylinder 47C has an inner circumferential surface 47S in contact with an outer circumferential surface 8S of the spindle shaft 8A. The hammer projections 47D protrude frontward from the body 47A.

The hammer 47 is rotated by the motor 6. A rotational force from the motor 6 is transmitted to the hammer 47 through the reducer 7 and the spindle 8. The hammer 47 is rotatable together with the spindle 8 in response to a rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The washer 50 is received in the recess 47E. The washer 50 is supported by the hammer 47 with the multiple balls 54 in between. The balls 54 are located frontward from the washer 50. The balls 54 are located between the rear surface of the body 47A and the front surface of the washer 50.

The coil spring 49 surrounds the spindle shaft 8A. The coil spring 49 has the rear end supported by the first flange 8B. The coil spring 49 has the front end received in the recess 47E and supported by the washer 50. The coil spring 49 constantly generates an elastic force for moving the hammer 47 forward.

The balls 48 are formed from a metal such as steel. The balls 48 are located between the spindle shaft 8A and the body 47A. The spindle shaft 8A has spindle grooves 8G. The spindle grooves 8G receive at least parts of the balls 48. The spindle grooves 8G are located on the outer circumferential surface of the spindle shaft 8A. The hammer 47 has hammer grooves 47G. The hammer grooves 47G receive at least parts of the balls 48. The hammer grooves 47G are located on parts of the inner circumferential surfaces of the body 47A and the inner cylinder 47C.

Two spindle grooves 8G are located on the outer circumferential surface of the spindle shaft 8A. The two hammer grooves 47G are located on the inner circumferential surfaces of the body 47A and the inner cylinder 47C. One ball 48 is located between one spindle groove 80 and one hammer groove 47G. The other ball 48 is located between the other spindle groove 8G and the other hammer groove 47G. The balls 48 are rollable along the spindle grooves 8G and the hammer grooves 47G. The hammer 47 is movable together with the balls 48. The spindle 8 and the hammer 47 are movable relative to each other in the axial direction and in the rotation direction within a movable range defined by the spindle grooves 8G and the hammer grooves 47G.

The anvil 10 is located frontward from the motor 6. The anvil 10 is an output unit of the impact tool 1 that rotates in response to a rotational force of the rotor 27. The anvil 10 is at least partially located frontward from the spindle 8. The anvil 10 is at least partially located frontward from the hammer 47. The anvil 10 is struck by the hammer 47 in the rotation direction.

The anvil 10 includes an anvil shaft 10A and two anvil projections 10B. The anvil shaft 10A is a rod elongated in the front-rear direction. The anvil shaft 10A has the central axis aligned with the rotation axis AX. The anvil projections 10B are located at the rear end of the anvil shaft 10A. The anvil projections 10B protrude radially outward from the rear end of the anvil shaft 10A.

The anvil 10 has a tool hole 10C in its front end face. The anvil 10 has an anvil recess 10D on its rear end face. The tool hole 10C extends rearward from the front end face of the anvil shaft 10A. The tool hole 10C receives a tip tool. The tip tool is attached to the anvil 10. The anvil recess 10D is recessed frontward from the rear end face of the anvil 10. The anvil recess 10D receives the spindle protrusion 8F.

The anvil 10 is rotatably supported by anvil bearings 46. The rotation axis of the anvil 10, the rotation axis of the hammer 47, and the rotation axis of the spindle 8 align with the rotation axis AX of the motor 6. The anvil 10 rotates about the rotation axis AX. The anvil bearings 46 surround the anvil shaft 10A. An O-ring 45 is located between each anvil bearing 46 and the anvil shaft 10A. The anvil bearings 46 are located inside the smaller cylinder 4B in the hammer case 4. The anvil bearings 46 are held by the smaller cylinder 4B in the hammer case 4. The hammer case 4 supports the anvil 10 with the anvil bearings 46. The anvil bearings 46 support a front portion of the anvil shaft 10A in a rotatable manner. In the embodiment, two anvil bearings 46 are arranged in the front-rear direction.

A washer 56 and a support 57 are located frontward from the anvil projections 10B. The support 57 is in contact with the rear surface of the joint 4C and the rear surface of the outer ring of the anvil bearings 46. The support 57 is annular. The support 57 reduces the likelihood of the anvil bearings 46 slipping rearward from the smaller cylinder 4B. The support 57 reduces contact between the front surfaces of the anvil projections 10B and the hammer case 4. The washer 56 supports the support 57 from the rear. The washer 56 is received in a groove on the inner circumferential surface of the larger cylinder 4A.

The hammer projections 47D can come in contact with the anvil projections 10B. When the motor 6 operates, with the hammer projections 47D and the anvil projections 10B in contact with each other, the anvil 10 rotates together with the hammer 47 and the spindle 8.

The anvil 10 is struck by the hammer 47 in the rotation direction. When, for example, the anvil 10 receives a higher load in an operation for tightening a screw, the anvil 10 cannot rotate under an urging force from the coil spring 49 alone. This stops the rotation of the anvil 10 and the hammer 47. The spindle 8 and the hammer 47 are movable relative to each other in the axial direction and in the circumferential direction through the balls 48. When the hammer 47 stops rotating, the spindle 8 continues to rotate with power generated by the motor 6. When the hammer 47 stops rotating and the spindle 8 rotates, the balls 48 move backward as being guided along the spindle grooves 8G and the hammer grooves 47G. When the hammer 47 stops and the spindle 8 rotates, the outer circumferential surface 8S of the spindle 8 and the inner circumferential surface 47S of the hammer 47 slide on each other. The hammer 47 receives a force from the balls 48 to move backward with the balls 48. In other words, the hammer 47 moves backward when the anvil 10 stops rotating and the spindle 8 rotates. Thus, the hammer projections 47D are apart from the anvil projections 10B.

The coil spring 49 constantly generates an elastic force for moving the hammer 47 forward. The hammer 47 that has moved backward moves forward under the elastic force from the coil spring 49. The hammer 47 then receives a force in the rotation direction from the balls 48. In other words, the hammer 47 moves forward while rotating. The hammer 47 then comes in contact with the anvil projections 10B while rotating. Thus, the anvil projections 10B are struck by the hammer projections 47D on the hammer 47 in the rotation direction. The anvil 10 receives power from the motor 6 and an inertial force from the hammer 47. The anvil 10 thus rotates at high torque about the rotation axis AX.

The tool holder 11 surrounds a front portion of the anvil 10. The tool holder 11 holds the tip tool received in the tool hole 10C in the anvil 10. The tip tool is attachable to and detachable from the tool holder 11.

The tool holder 11 includes balls 71, a leaf spring 72, a sleeve 73, a coil spring 74, and a positioner 75.

The anvil 10 has support recesses 76 for supporting the balls 71. The support recesses 76 are located on the outer surface of the anvil shaft 10A. In the embodiment, the anvil shaft 10A has two support recesses 76.

The balls 71 are supported on the anvil 10 in a movable manner. The balls 71 are received in the support recesses 76. One ball 71 is received in one support recess 76.

The anvil shaft 10A has a through-hole connecting the inner surfaces of the support recesses 76 and the inner surface of the tool hole 10C. Each ball 71 has a smaller diameter than the through-hole. The balls 71 supported in the support recesses 76 are at least partially received in the tool hole 10C. The balls 71 fasten the tip tool received in the tool hole 10C. Each ball 71 is movable between an engagement position and a release position. At the engagement position, the balls 71 fasten the tip tool. At the release position, the balls 71 unfasten the tip tool.

The leaf spring 72 generates an elastic force for moving the balls 71 to the engagement position. The leaf spring 72 surrounds the anvil shaft 10A. The leaf spring 72 generates an elastic force for moving the balls 71 forward.

The sleeve 73 is cylindrical. The sleeve 73 surrounds the anvil shaft 10A. The sleeve 73 is movable in the axial direction around the anvil shaft 10A. The sleeve 73 restricts the balls 71 at the engagement position from coming out of the engagement position. The sleeve 73 moves in the axial direction to permit the balls 71 to be movable from the engagement position to the release position.

The sleeve 73 is movable between a movement-restricting position and a movement-permitting position around the anvil shaft 10A. At the movement-restricting position, the sleeve 73 restricts radially outward movement of the balls 71. At the movement-permitting position, the sleeve 73 permits radially outward movement of the balls 71.

The sleeve 73 at the movement-restricting position restricts the balls 71 at the engagement position from moving radially outward. In other words, the sleeve 73 at the movement-restricting position restricts the balls 71 at the engagement position from coming out of the engagement position. Thus, the tip tool remains fastened by the balls 71.

The sleeve 73 moves to the movement-permitting position to permit the balls 71 at the engagement position to move radially outward. The sleeve 73 moves to the movement-permitting position to permit the balls 71 to move from the engagement position to the release position. In other words, the sleeve 73 at the movement-permitting position permits the balls 71 to come out of the engagement position. This causes the tip tool fastened by the balls 71 to be unfastened.

The coil spring 74 generates an elastic force for moving the sleeve 73 to the movement-restricting position. The coil spring 74 surrounds the anvil shaft 10A. The movement-restricting position is defined rearward from the movement-permitting position. The coil spring 74 generates an elastic force for moving the sleeve 73 backward.

The positioner 75 is annular and is fixed on the outer surface of the anvil shaft 10A. The positioner 75 is fixed to face the rear end of the sleeve 73. The positioner 75 positions the sleeve 73 at the movement-restricting position. The sleeve 73 under an elastic force from the coil spring 74 for moving backward comes in contact with the positioner 75 and is positioned at the movement-restricting position.

The fan 12 is located rearward from the stator 26 in the motor 6. The fan 12 generates an airflow for cooling the motor 6. The fan 12 is fastened to at least a part of the rotor 27. The fan 12 is fastened to a rear portion of the rotor shaft 33 with a bush 12A. The fan 12 is located between the rear rotor bearing 37 and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 19 to cool the motor 6. As the fan 12 rotates, the air passing through the internal space of the housing 2 flows out of the housing 2 through the outlets 20.

The battery mount 13 is located in a lower portion of the battery holder 23. The battery mount 13 is connected to the battery pack 25. The battery pack 25 is attached to the battery mount 13 in a detachable manner. The battery pack 25 is placed onto the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever 15 is operable to switch the rotation direction of the motor 6 between forward and reverse. This operation switches the rotation direction of the spindle 8.

The light assembly 18 emits illumination light. The light assembly 18 illuminates the anvil 10 and an area around the anvil 10 with illumination light. The light assembly 18 illuminates an area ahead of the anvil 10 with illumination light. The light assembly 18 illuminates the tip tool attached to the anvil 10 and an area around the tip tool with illumination light. The light assembly 18 in the embodiment surrounds the smaller cylinder 4B. The light assembly 18 includes a circuit board 18A, a light emitter 18B, and an optical member 18C. The light emitter 18B is supported on the circuit board 18A. Light emitted from the light emitter 18B passes through the optical member 18C. The optical member 18C is annular.

The light cover 52 protects the light assembly 18. The light cover 52 reduces contact between the light assembly 18 and objects around the light assembly 18. The light cover 52 surrounds the optical member 18C.

Internal Space of Spindle

Figure 5:
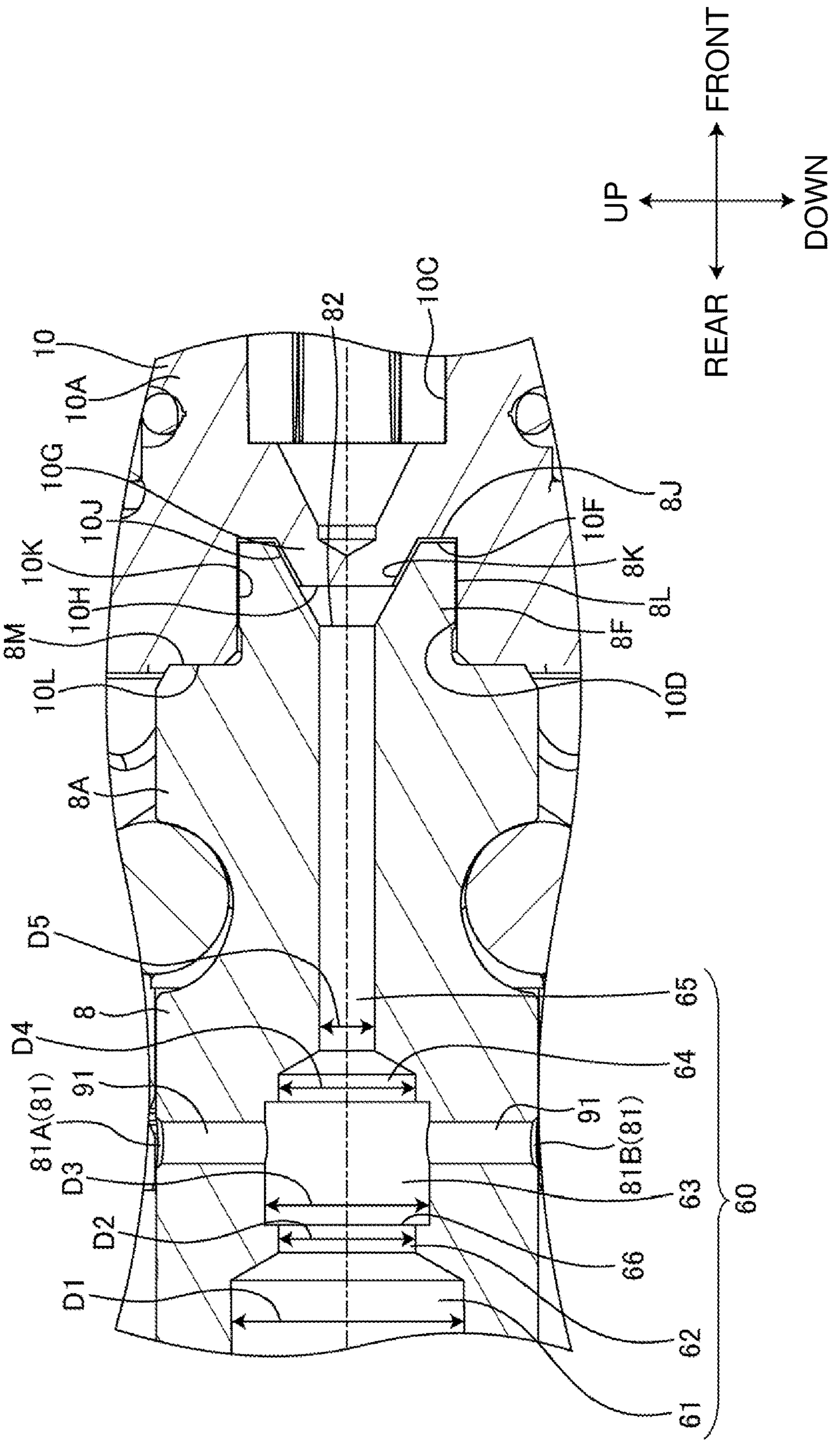
FIG. 5 is a partially enlarged view of FIG. 3.

FIG. 5 is a partially enlarged view of FIG. 3. The spindle 8 has an internal space 60 as shown in FIGS. 3 to 5. The spindle 8 has an opening in its rear end face. The internal space 60 defined in the spindle 8 extends frontward from the opening in the rear end face of the spindle 8.

The internal space 60 includes a first space 61, a second space 62, a third space 63, a fourth space 64, and a fifth space

65. The first space 61 is connected to the opening in the rear end face of the spindle 8. The rear end of the first space 61 receives the front end of the pinion gear 41 through the opening in the rear end face of the spindle 8. The second space 62 is located frontward from the first space 61. The third space 63 is located frontward from the second space 62. The fourth space 64 is located frontward from the third space 63. The fifth space 65 is located frontward from the fourth space 64.

The first space 61, the second space 62, the third space 63, the fourth space 64, and the fifth space 65 are substantially cylindrical. The first space 61, the second space 62, the third space 63, the fourth space 64, and the fifth space 65 are circular in a cross section orthogonal to the rotation axis AX. The first space 61, the second space 62, the third space 63, the fourth space 64, and the fifth space 65 have their central axes substantially aligned with one another. The first space 61, the second space 62, the third space 63, the fourth space 64, and the fifth space 65 have their central axes substantially aligned with the rotation axis AX.

The second space 62 has a second inner diameter D2 smaller than a first inner diameter D1 of the first space 61. The third space 63 has a third inner diameter D3 larger than the second inner diameter D2. The third inner diameter D3 is smaller than the first inner diameter D1. The third inner diameter D3 is larger than a fourth inner diameter D4 of the fourth space 64. The fifth space 65 has a fifth inner diameter D5 smaller than the fourth inner diameter D4. The second inner diameter D2 is equal to the fourth inner diameter D4. In other words, D1>D3>D2=D4>D5.

The third space 63 has a dimension in the front-rear direction larger than the corresponding dimensions of the second space 62 and the fourth space 64. The third space 63 has a dimension in the front-rear direction smaller than the corresponding dimensions of the first space 61 and the fifth space 65. The fifth space 65 has a dimension in the front-rear direction larger than the corresponding dimension of the first space 61.

The first space 61 has its rear end connected to the opening in the rear end face of the spindle 8. The first space 61 has its front end connected to the rear end of the second space 62 with a tapered passage. The second space 62 has its front end connected to the rear end of the third space 63. A step surface 66 is located at the boundary between the front end of the second space 62 and the rear end of the third space 63. The step surface 66 faces frontward. The front end of the third space 63 is connected to the rear end of the fourth space 64 with a tapered passage. The front end of the fourth space 64 is connected to the rear end of the fifth space 65 with a tapered passage.

The third space 63 contains a lubricant oil. The lubricant oil includes grease.

The spindle 8 includes first feed ports 81 and a second feed port 82.

The first feed ports 81 are located on the outer circumferential surface of the spindle shaft 8A. The first feed ports 81 allow supply of the lubricant oil from the first space 61 to between the spindle 8 and the hammer 47. The first feed ports 81 in the embodiment allow supply of the lubricant oil to between the outer circumferential surface 8S of the spindle shaft 8A and the inner circumferential surface 47S of the inner cylinder 47C. The first feed ports 81 connect to the third space 63 through a first flow channel 91 defined inside the spindle shaft 8A. The first flow channel 91 extends radially outward from the third space 63 to connect the third space 63 with the first feed ports 81. Under a centrifugal force from the spindle 8, the lubricant oil contained in the third space 63 flows through the first flow channel 91 toward the first feed ports 81. The lubricant oil supplied from the third space 63 to the first feed ports 81 through the first flow channel 91 is supplied to between the outer circumferential surface 8S of the spindle shaft 8A and the inner circumferential surface 47S of the inner cylinder 47C.

When the hammer 47 stops and the spindle 8 rotates, the outer circumferential surface 8S of the spindle 8 and the inner circumferential surface 47S of the hammer 47 slide on each other. The lubricant oil is supplied to between sliding surfaces, or more specifically, to the outer circumferential surface 8S and the inner circumferential surface 47S, to reduce wear or seizure of the outer circumferential surface 8S and the inner circumferential surface 47S.

Multiple first feed ports 81 are arranged in the circumferential direction. The first feed ports 81 in the embodiment have a first feed port 81A and a first feed port 81B. The first feed port 81B is at a position different from the first feed port 81A in the circumferential direction. The first feed port 81A is substantially aligned with the first feed port 81B in the front-rear direction. The first feed port 81A and the first feed port 81B are at positions different from each other by 180 degrees in the circumferential direction.

The relative angle between the first feed port 81A and the first feed port 81B in the circumferential direction is a mere example. The first feed ports 81 may be two first feed ports 81, which may be replaced by a single first feed port 81 or by three or more first feed ports 81.

The second feed port 82 is located in the front end of the spindle 8. The second feed port 82 allows supply of the lubricant oil from the third space 63 to between the spindle 8 and the anvil 10. The fifth space 65 has the front end connected to the second feed port 82. The second feed port 82 in the embodiment is located in the spindle protrusion 8F. The second feed port 82 in the embodiment allows supply of the lubricant oil to between the surface of the spindle protrusion 8F and the inner surface of the anvil recess 10D. The lubricant oil supplied from the third space 63 to the second feed port 82 through the fourth space 64 and the fifth space 65 is supplied to between the surface of the spindle protrusion 8F and the inner surface of the anvil recess 10D.

Spindle Protrusion and Anvil Recess

As shown in FIG. 5, the spindle 8 includes the spindle shaft 8A and the spindle protrusion 8F. The spindle protrusion 8F protrudes frontward from a front end face 8M of the spindle shaft 8A. The anvil 10 has the anvil recess 10D on a rear end face 10L. The anvil recess 10D receives the spindle protrusion 8F.

The spindle 8 has a receiving recess 8K. The receiving recess 8K is recessed rearward from a front end face 8J of the spindle protrusion 8F. The front end face 8J faces frontward. The anvil 10 has a projection 10G protruding rearward from a bottom surface 10F of the anvil recess 10D. The bottom surface 10F faces rearward. The projection 10G is located inside the receiving recess 8K. The second feed port 82 is located at the bottom surface of the receiving recess 8K facing frontward.

The projection 10G is tapered with its outer diameter decreasing rearward. The receiving recess 8K has an inner diameter decreasing rearward. The receiving recess 8K is tapered with its inner diameter decreasing rearward to be in conformance with the projection 10G. The projection 10G has a rear end face 10H located frontward from the rear end face 10L of the anvil 10.

In the embodiment, the spindle shaft 8A has the front end face 8M in contact with the rear end face 10L of the anvil 10. The spindle protrusion 8F has an outer circumferential surface 8L in contact with an inner circumferential surface 10K of the anvil recess 10D. The spindle protrusion 8F has the front end face 8J facing the bottom surface 10F of the anvil recess 10D with a gap in between. The projection 10G has an outer circumferential surface 103 parallel to the inner circumferential surface of the receiving recess 8K. The projection 10G has the outer circumferential surface 10J facing the inner circumferential surface of the receiving recess 8K with a gap in between. The projection 10G has the rear end face 10H facing the second feed port 82. The rear end face 10H of the projection 10G and the second feed port 82 are apart from each other.

Socket Holder

Figure 6:
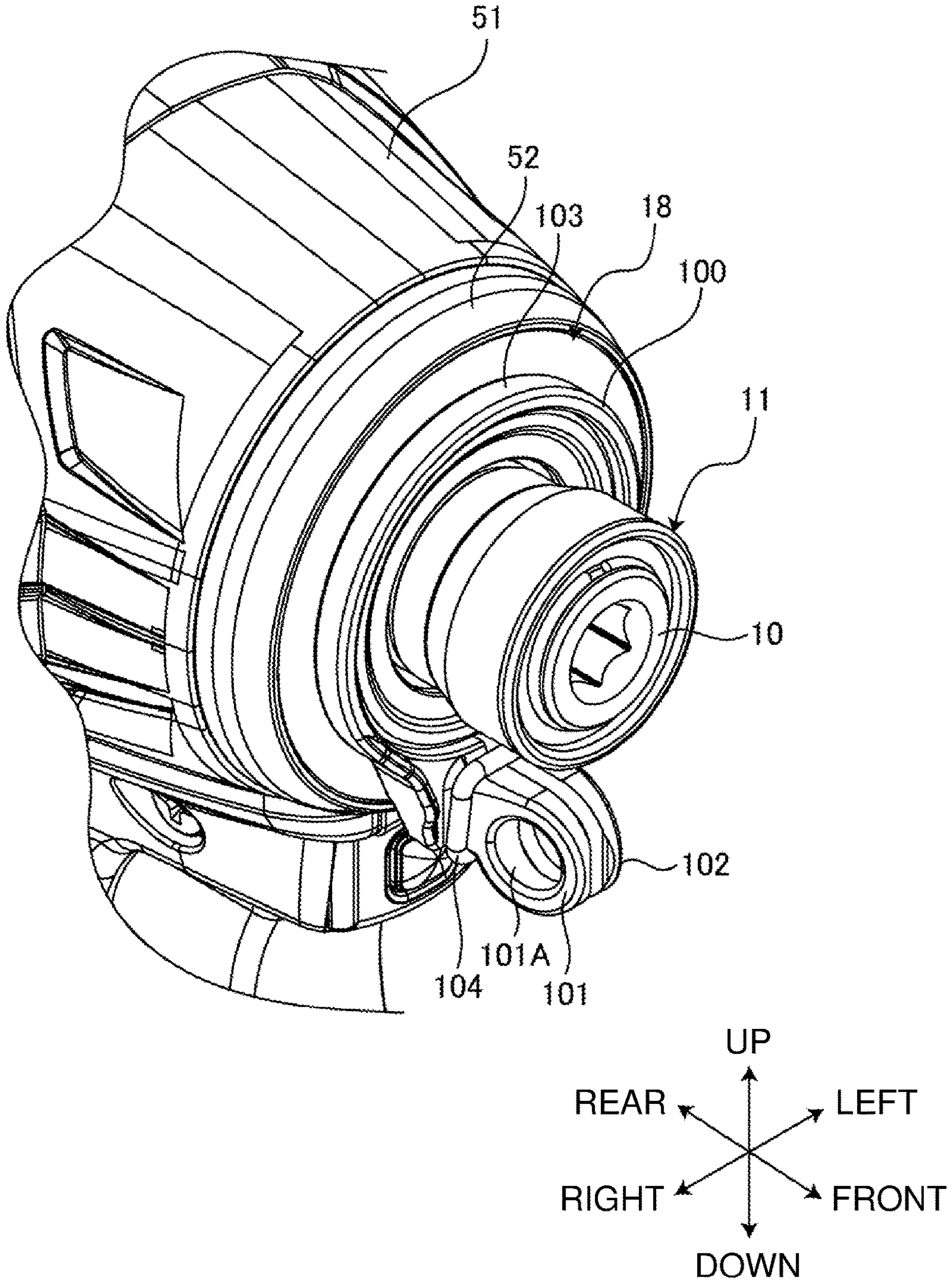
FIG. 6 is a perspective view of the upper portion of the impact tool according to the embodiment as viewed from the front.
Figure 7:
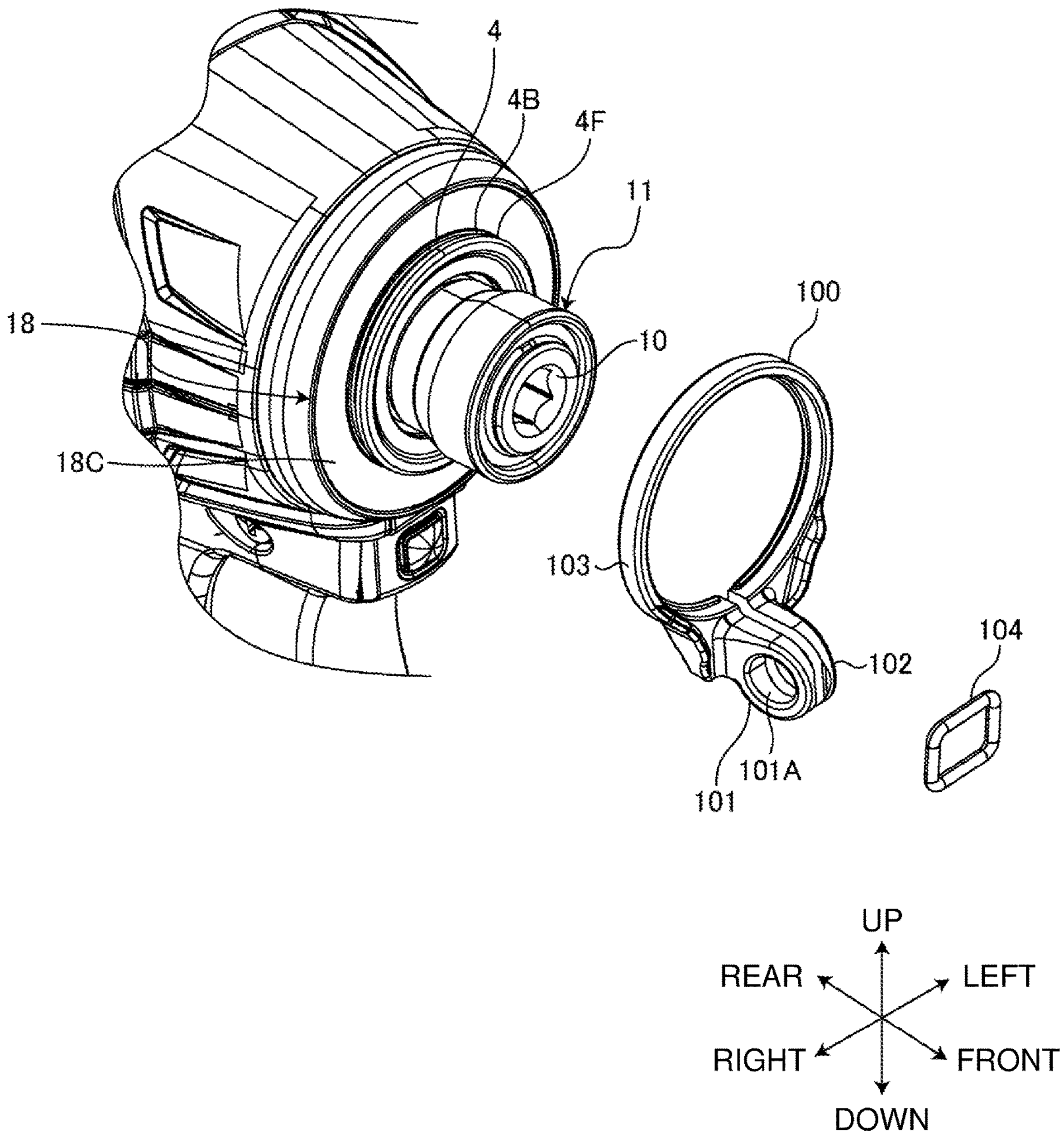
FIG. 7 is an exploded perspective view of the upper portion of the impact tool according to the embodiment as viewed from the right front.
Figure 8:
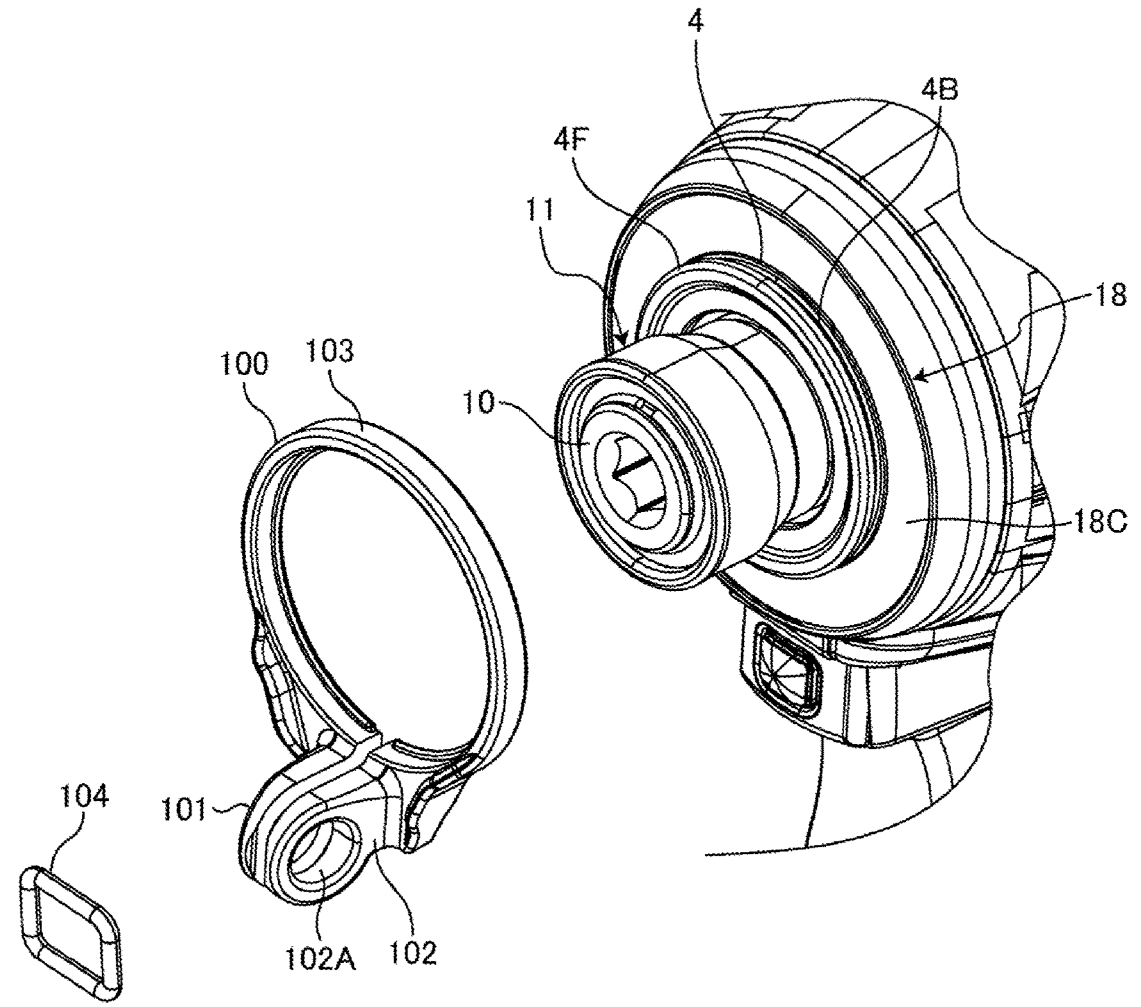
FIG. 8 is an exploded perspective view of the upper portion of the impact tool according to the embodiment as viewed from the left front.
Figure 8:
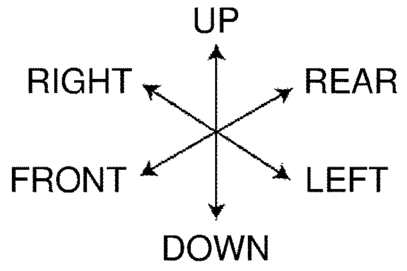
Figure 9:
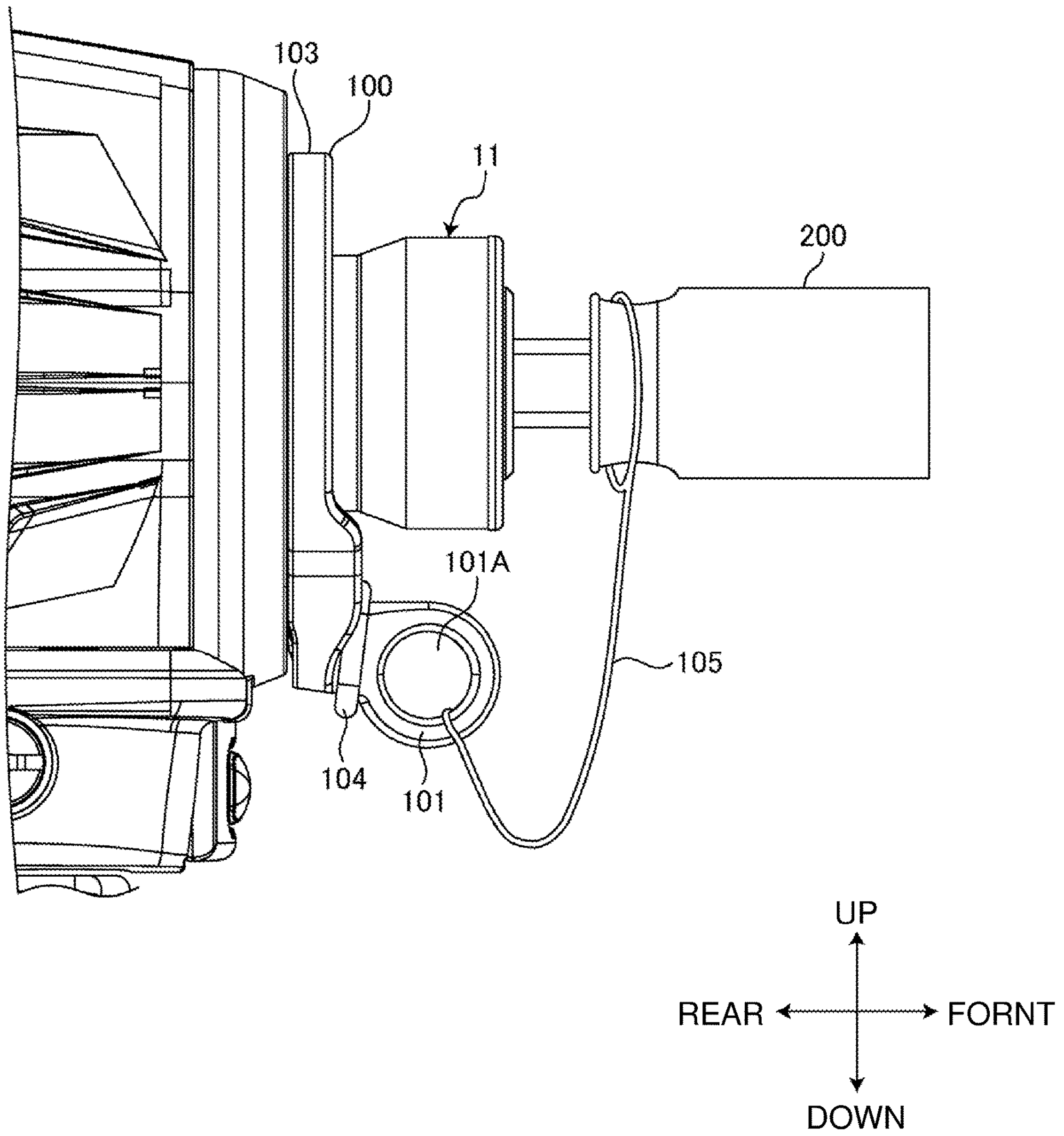
FIG. 9 is a side view of the upper portion of the impact tool according to the embodiment.

FIG. 6 is a perspective view of the upper portion of the impact tool 1 according to the embodiment as viewed from the front. FIG. 7 is an exploded perspective view of the upper portion of the impact tool 1 as viewed from the right front. FIG. 8 is an exploded perspective view of the upper portion of the impact tool 1 as viewed from the left front. FIG. 9 is a side view of the upper portion of the impact tool 1.

As shown in FIG. 9, a socket 200 may be attached to the anvil 10. The socket 200 has a hexagonal hole in its front end. The socket 200 has, in its rear portion, an insertion portion to be inserted into the tool hole 10C in the anvil 10. With the head of a bolt received in the hexagonal hole in the socket 200, the bolt is tightened into the workpiece as the anvil 10 rotates.

A socket holder 100 is attached to the hammer case 4. The socket holder 100 holds the socket 200 with a connector 105. The socket holder 100 includes an arc 103, a first holder 101, a second holder 102, and an elastic ring 104. The arc 103 can be hooked on a hook 4F on the hammer case 4. The first holder 101 is atone end of the arc 103. The second holder 102 is at the other end of the arc 103. The elastic ring 104 fastens the first holder 101 and the second holder 102 together.

As shown in FIGS. 4 and 7, the hook 4F is located on the smaller cylinder 4B in the hammer case 4. The hook 4F protrudes radially outward from the outer circumferential surface of the smaller cylinder 4B. The hook 4F is annular. The arc 103 has a recess on its inner circumferential surface to receive the hook 4F. With the hook 4F received inside the recess on the arc 103, the arc 103 is hooked on the hook 4F.

The first holder 101 and the second holder 102 each hold the connector 105. The first holder 101 protrudes frontward from one end of the arc 103. The second holder 102 protrudes frontward from the other end of the arc 103. The first holder 101 and the second holder 102 are plates. The first holder 101 has a first opening 101A. The second holder 102 has a second opening 102A.

The elastic ring 104 fastens the first holder 101 and the second holder 102 together. The elastic ring is, for example, a rubber ring. The elastic ring 104 surrounds the first holder 101 and the second holder 102.

To attach the socket holder 100 to the hammer case 4, the operator places the arc 103 around the smaller cylinder 4B with the arc 103 elastically deformed to have a larger diameter. After the arc 103 is placed around the smaller cylinder 4B and the hook 4F is received in the recess on the arc 103, the operator attaches the elastic ring 104 to the first holder 101 and the second holder 102 from the front. This reduces separation between the first holder 101 and the second holder 102.

The connector 105 is a wire. The connector 105 may be a cord, a chain, or a flexible tube. The connector 105 has a first end attachable to the front of the socket 200. The connector 105 has a second end attachable to the first holder 101 and the second holder 102. The connector 105 has the second end placeable through the first opening 101A and the second opening 102A. The socket holder 100 holds the socket 200 with the connector 105. The front of the socket 200 is held by the socket holder 100 to reduce the likelihood that the front of the socket 200 falls off when the socket 200 is broken at the middle.

The socket holder 100 attached to the hammer case 4 is located in front of the light assembly 18. The arc 103 includes a plate that is thin in the radial direction. This reduces the likelihood that a light emitting surface (the front surface) of the optical member 18C is covered with the arc 103. Although the light emitting surface of the optical member 18C may be partially covered with the arc 103, the arc 103 and the light emitter 18B are located in their respective placement ranges 301 and 302 that do not overlap each other in the radial direction as shown in FIG. 3. The placement range 302 is radially outward from the placement range 301. Thus, with the socket holder 100 attached to the hammer case 4, the light assembly 18 can sufficiently illuminate the target object ahead of the light assembly 18.

Operation of Impact Tool

The operation of the impact tool 1 will now be described. To perform a screwing operation on a workpiece, for example, the tip tool (screwdriver bit) for the screwing operation is placed into the tool hole 10C in the anvil 10. The tip tool in the tool hole 10C is held by the tool holder 11. After the tip tool is attached to the anvil 10, the operator grips the grip 22 with, for example, the right hand and pulls the trigger lever 14 with the right index finger. Power is then supplied from the battery pack 25 to the motor 6 to activate the motor 6 and turn on the light assembly 18 simultaneously. In response to the activation of the motor 6, the rotor shaft 33 in the rotor 27 rotates. A rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are rotatably supported by the spindle 8 with the pin 42P. The revolving planetary gears 42 rotate the spindle 8 at a lower rotational speed than the rotor shaft 33.

When the spindle 8 rotates with the hammer projections 47D and the anvil projections 10B in contact with each other, the anvil 10 rotates together with the hammer 47 and the spindle 8. Thus, the screwing operation proceeds.

When the anvil 10 receives a predetermined or higher load as the screwing operation proceeds, the anvil 10 and the hammer 47 stop rotating. When the hammer 47 stops rotating and the spindle 8 rotates, the hammer 47 moves backward. Thus, the hammer projections 47D are apart from the anvil projections 10B. The hammer 47 that has moved backward moves forward while rotating under an elastic force from the coil spring 49. The anvil 10 is struck by the hammer 47 in the rotation direction. The anvil 10 thus rotates about the rotation axis AX at high torque. The screw is thus tightened into the workpiece at high torque.

As described above, the impact tool 1 according to the present embodiment includes the motor 6, the spindle 8, the hammer 47, the anvil 10, and the internal space 60. The spindle 8 is at least partially located frontward from the motor 6 and rotatable by the motor 6. The hammer 47 surrounds the spindle 8. The anvil 10 is at least partially located frontward from the spindle 8 and is strikable by the hammer 47 in the rotation direction. The internal space 60 is defined in the spindle 8 and extends frontward from the opening in the rear end face of the spindle 8. The internal space 60 includes the first space 61 having the first inner diameter D1 connected to the opening, the second space 62 located frontward from the first space 61 and having the second inner diameter D2 smaller than the first inner diameter D1, and the third space 63 connected to the front end of the second space 62 and having the third inner diameter D3 larger than the second inner diameter D2. The third space 63 contains the lubricant oil.

In the above structure, the second space 62 having a smaller inner diameter is located between the first space 61 and the third space 63. The second space 62 resists the flow of the lubricant oil to reduce the likelihood that the lubricant oil contained in the third space 63 flows through the second space 62 into the first space 61. This structure thus reduces any leak of the lubricant oil contained in the third space 63 through the opening. This structure reduces the likelihood of less lubricant oil being supplied between the spindle 8 and the hammer 47. This thus reduces wear or seizure of the spindle 8 and the hammer 47. The impact tool 1 is thus less likely to have a shorter service life.

The spindle 8 includes the step surface 66 facing frontward and located at the boundary between the front end of the second space 62 and the rear end of the third space 63. The step surface 66 reduces the likelihood of the lubricant oil contained in the third space 63 flowing into the second space 62.

In the embodiment, the third inner diameter D3 is smaller than the first inner diameter D1.

This structure reduces the likelihood that the strength of the spindle 8 decreases.

The spindle 8 in the embodiment includes the first feed ports 81 in the outer circumferential surface to allow supply of the lubricant oil from the third space 63 to between the spindle 8 and the hammer 47.

In this structure, the first feed ports 81 allow supply of the lubricant oil from the third space 63 to between the spindle 8 and the hammer 47.

The spindle 8 in the embodiment includes the first flow channel 91 connecting the third space 63 to the first feed ports 81.

In this structure, the lubricant oil in the third space 63 is supplied to the first feed ports 81 through the first flow channel 91 under a centrifugal force generated as the spindle 8 rotates.

The hammer 47 in the embodiment includes the body 47A, and the inner cylinder 47C protruding rearward from the body 47A and having the inner circumferential surface in contact with the outer circumferential surface of the spindle 8. The first feed ports 81 allow supply of the lubricant oil to between the outer circumferential surface of the spindle 8 and the inner circumferential surface of the inner cylinder 47C in the hammer 47.

The lubricant oil supplied from the third space 63 to between the outer circumferential surface of the spindle 8 and the inner circumferential surface of the inner cylinder 47C of the hammer 47 can reduce wear or seizure of the outer circumferential surface of the spindle 8 and the inner circumferential surface of the inner cylinder 47C in the hammer 47.

The spindle 8 in the embodiment includes the first feed ports 81 in the circumferential direction.

The first feed ports 81 allow uniform supply of the lubricant oil to between the outer circumferential surface of the spindle 8 and the inner circumferential surface of the inner cylinder 47C in the hammer 47.

The spindle 8 in the embodiment includes, in the front end, the second feed port 82 to allow supply of the lubricant oil from the third space 63 to between the spindle 8 and the anvil 10.

This structure allows supply of the lubricant oil from the third space 63 to between the spindle 8 and the anvil 10, thus reducing wear of the spindle 8 and the anvil 10.

The spindle 8 in the embodiment includes the spindle shaft 8A and the spindle protrusion 8F protruding frontward from the front end of the spindle shaft 8A. The anvil 10 has, on its rear end face, the anvil recess 10D receiving the spindle protrusion 8F. The hammer 47 surrounds the spindle shaft 8A. The second feed port 82 is located in the spindle protrusion 8F.

This structure allows supply of the lubricant oil from the third space 63 to between the surface of the spindle protrusion 8F and the internal surface of the anvil recess 10D, thus reducing wear of the surface of the spindle protrusion 8F and the inner surface of the anvil recess 10D.

The spindle 8 in the embodiment has the receiving recess 8K recessed rearward from the front end face of the spindle protrusion 8F facing frontward. The anvil 10 includes the projection 10G protruding rearward from the bottom surface 10F of the anvil recess 10D facing rearward. The projection 10G is located inside the receiving recess 8K.

This can avoid a longer overall length of the impact tool 1, and also avoid a smaller area of contact between the spindle protrusion 8F and the anvil recess 10D. A smaller area of contact between the spindle protrusion 8F and the anvil recess 10D can increase the stress (contact surface pressure) on at least one of the spindle protrusion 8F or the anvil recess 10D, possibly causing severe wear or seizure of at least one of the spindle protrusion 8F or the anvil recess 10D. This structure reduces the area of contact between the spindle protrusion 8F and the anvil recess 10D to reduce wear or seizure of the spindle protrusion 8F and the anvil recess 10D. For example, this can avoid a longer overall length of the impact tool 1, and also avoid a smaller area of contact between the outer circumferential surface 8L and the inner circumferential surface 10K. Thus, the impact tool 1 is less likely to have a shorter service life. The overall length of the impact tool 1 is the distance in the front-rear direction between the rear end of the rear cover 3 and the front end of the anvil 10.

The second feed port 82 in the embodiment is located on the bottom surface of the receiving recess 8K facing frontward.

This allows uniform supply of the lubricant oil to the surface of the spindle protrusion 8F and the inner surface of the anvil recess 10D.

The projection 10G in the embodiment is tapered with its outer diameter decreasing rearward.

The projection 10G can thus be in conformance with the rear end of the tool hole 10C in the anvil 10.

In the embodiment, the projection 10G has the rear end (rear end face 10H) located frontward from the rear end face 10L of the anvil 10.

Without the projection 10G protruding rearward from the rear end face 10L of the anvil 10, the receiving recess 8K can avoid having an excess depth.

The impact tool 1 according to the present embodiment includes the hammer case 4 supporting the anvil 10 with the anvil bearings 46. The anvil 10 has the tool hole 10C to receive the rear portion of the socket 200. The hammer case 4 receives the socket holder 100 attachable to hold the socket 200 with the connector 105. The socket holder 100 includes the arc 103 to be hooked on the hook 4F on the hammer case 4, the first holder 101 at one end of the arc 103, the second holder 102 at the other end of the arc 103, and the elastic ring 104 to fasten the first holder 101 and the second holder 102 together. The connector 105 is connectable to the first holder 101 and to the second holder 102.

Thus, the front of the socket 200 is held by the socket holder 100 to reduce the likelihood that the front of the socket 200 falls off when the socket 200 is broken at the middle. With the elastic ring 104 fastening the first holder 101 and the second holder 102 together, the socket holder 100 can have a simplified structure and can be less costly.

The first holder 101 in the embodiment protrudes frontward from one end of the arc 103. The second holder 102 protrudes frontward from the other end of the arc 103.

This allows the operator to attach the elastic ring 104 around the first holder 101 and the second holder 102 from the front of the first holder 101 and the second holder 102.

The first holder 101 in the embodiment has the first opening 101A. The second holder 102 has the second opening 102A. The connector 105 is placeable through each of the first opening 101A and the second opening 102A.

This connects the socket holder 100 and the connector 105 together.

Other Embodiments

In the above embodiment, the impact tool 1 is an impact driver. The impact tool 1 may be an impact wrench.

In the above embodiment, the impact tool 1 may use utility power (alternating current power supply) in place of the battery pack 25.

REFERENCE SIGNS LIST

1 impact tool
2 housing
2L left housing
2R right housing
2S screw
3 rear cover
3S screw
4 hammer case
4A larger cylinder
4B smaller cylinder
4C joint
4F hook
6 motor
7 reducer
8 spindle
8A spindle shaft
8B first flange
8C second flange
8D connecting portion
8F spindle protrusion
8K receiving recess
83 front end face
8L outer circumferential surface
8M front end face
8G spindle groove
8S outer circumferential surface
9 striker
10 anvil
10A anvil shaft
10B anvil projection
10C tool hole
10D anvil recess
10F bottom surface
10G projection
10L rear end face
10H rear end face
10J outer circumferential surface
10K inner circumferential surface
11 tool holder
12 fan
12A bush
13 battery mount
14 trigger lever
15 forward-reverse switch lever
18 light assembly
18A circuit board
18B light emitter
18C optical member
19 inlet
20 outlet
21 motor compartment
22 grip
23 battery holder
24 bearing box
24A rear annular portion
24B front annular portion
24C joint
25 battery pack
26 stator
27 rotor
28 stator core
29 rear insulator
30 front insulator
30S screw
31 coil
32 rotor core
33 rotor shaft
34A rotor magnet
34B sensor magnet
35 sensor board
36 fusing terminal
37 rear rotor bearing
38 front rotor bearing
41 pinion gear
42 planetary gear
42P pin
43 internal gear
44 spindle bearing
45 O-ring
46 anvil bearing
47 hammer
47A body
47B outer cylinder
47C inner cylinder
47D hammer projection
47E recess
47G hammer groove
47S inner circumferential surface
48 ball
49 coil spring
50 washer
51 hammer case cover
52 light cover
54 ball
56 washer
57 support
59 opening
60 internal space
61 first space
62 second space 63 third space
64 fourth space
65 fifth space
66 step surface
71 ball
72 leaf spring
73 sleeve
74 coil spring
75 positioner
76 support recess
81 first feed port
81A first feed port
81B first feed port
82 second feed port
91 first flow channel
100 socket holder
101 first holder
101A first opening
102 second holder
102A second opening
103 arc
104 elastic ring
105 connector
200 socket
AX rotation axis
D1 first inner diameter
D2 second inner diameter
D3 third inner diameter
D4 fourth inner diameter
D5 fifth inner diameter

What is claimed is:

1. An impact tool, comprising:
a motor;
a spindle at least partially located frontward from the motor and rotatable by the motor, the spindle including an internal space extending frontward from an opening in a rear end face of the spindle, the internal space including
a first space having a first inner diameter, having a cylindrical shape and connected to the opening,
a second space located frontward from the first space, having a second inner diameter smaller than the first inner diameter and having a cylindrical shape, and
a third space connected to a front end of the second space, having a third inner diameter larger than the second inner diameter and having a cylindrical shape, the third space containing a lubricant oil,
a central axis of the first space, a central axis of the second space, and a central axis of the third space are parallel to a rotation axis of the spindle;
a hammer surrounding the spindle; and
an anvil at least partially located frontward from the spindle, the anvil being strikable by the hammer in a rotation direction.

2. The impact tool according to claim 1, wherein
the spindle includes a step surface facing frontward and located at a boundary between the front end of the second space and a rear end of the third space.

3. The impact tool according to claim 2, wherein
the third inner diameter is smaller than the first inner diameter.

4. The impact tool according to claim 2, wherein
the spindle includes a first feed port in an outer circumferential surface to allow supply of the lubricant oil from the third space to between the spindle and the hammer.

5. The impact tool according to claim 1, wherein
the third inner diameter is smaller than the first inner diameter.

6. The impact tool according to claim 1, wherein
the spindle includes a first feed port in an outer circumferential surface to allow supply of the lubricant oil from the third space to between the spindle and the hammer.

7. The impact tool according to claim 6, wherein
the spindle includes a first flow channel connecting the third space to the first feed port.

8. The impact tool according to claim 6, wherein
the hammer includes
a body, and
an inner cylinder protruding rearward from the body and having an inner circumferential surface in contact with the outer circumferential surface of the spindle, and
the first feed port allows supply of the lubricant oil to between the outer circumferential surface of the spindle and the inner circumferential surface of the inner cylinder.

9. The impact tool according to claim 6, wherein
the spindle includes a plurality of the first feed ports in a circumferential direction.

10. The impact tool according to claim 1, wherein
the spindle includes, in a front end of the spindle, a second feed port to allow supply of the lubricant oil from the third space to between the spindle and the anvil.

11. The impact tool according to claim 10, wherein
the spindle includes
a spindle shaft, and
a spindle protrusion protruding frontward from a front end of the spindle shaft,
the anvil has, on a rear end face of the anvil, an anvil recess receiving the spindle protrusion,
the hammer surrounds the spindle shaft, and
the second feed port is located in the spindle protrusion.

12. The impact tool according to claim 11, wherein
the spindle has a receiving recess recessed rearward from a front end face of the spindle protrusion facing frontward,
the anvil includes a projection protruding rearward from a bottom surface of the anvil recess facing rearward, and
the projection is located inside the receiving recess.

13. The impact tool according to claim 12, wherein
the second feed port is located on a bottom surface of the receiving recess facing frontward.

14. The impact tool according to claim 1, wherein
the spindle includes a spindle groove on an outer surface, and
the first space, the second space and the third space are located rearward from the spindle groove in an axial direction.

15. An impact tool, comprising:
a motor;
a spindle at least partially located frontward from the motor and rotatable by the motor, the spindle including
a spindle shaft,
a spindle protrusion protruding frontward from a front end of the spindle shaft, and
a receiving recess recessed rearward from a front end face of the spindle protrusion facing frontward;
a hammer surrounding the spindle shaft; and
an anvil at least partially located frontward from the spindle, the anvil being strikable by the hammer in a rotation direction, the anvil including an anvil recess receiving the spindle protrusion on a rear end face of the anvil, and a projection protruding rearward from a bottom surface of the anvil recess facing rearward, the projection being located inside the receiving recess, wherein the projection is tapered with an outer diameter of the projection decreasing rearward.

16. The impact tool according to claim 15, wherein the projection has a rear end face located frontward from the rear end face of the anvil.

17. An impact tool, comprising:

a motor;

a spindle at least partially located frontward from the motor and rotatable by the motor;

a hammer surrounding the spindle;

an anvil at least partially located frontward from the spindle, the anvil being strikable by the hammer in a rotation direction; and a hammer case supporting the anvil with an anvil bearing, wherein the anvil has a tool hole to receive a rear portion of a socket, a socket holder to hold the socket with a connector is attachable to the hammer case, the socket holder includes an arc to be hooked on a hook on the hammer case, a first holder at one end of the arc, a second holder at another end of the arc, and an elastic ring to fasten the first holder and the second holder together, and the connector is connectable to each of the first holder and the second holder.

18. The impact tool according to claim 17, wherein the first holder protrudes frontward from the one end of the arc, and the second holder protrudes frontward from the other end of the arc.

19. The impact tool according to claim 17, wherein the first holder has a first opening, the second holder has a second opening, and the connector is placeable through each of the first opening and the second opening.

* * * * *